(12) United States Patent
Pappachan et al.

(10) Patent No.: US 10,339,327 B2
(45) Date of Patent: Jul. 2, 2019

(54) TECHNOLOGIES FOR SECURELY BINDING A PLATFORM MANIFEST TO A PLATFORM

(71) Applicant: Intel Corporation, Santa Clara, CA (US)

(72) Inventors: Pradeep M. Pappachan, Hillsboro, OR (US); Reshma Lal, Hillsboro, OR (US); Siddhartha Chhabra, Portland, OR (US); Gideon Gerzon, Zichron Yaakov (IL); Baruch Chaikin, Misagv (IL); Bin Xing, Hillsboro, OR (US); William A. Stevens, Jr., Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 185 days.

(21) Appl. No.: 15/628,012

(22) Filed: Jun. 20, 2017

(65) Prior Publication Data

US 2017/0364689 A1 Dec. 21, 2017

Related U.S. Application Data

(60) Provisional application No. 62/352,356, filed on Jun. 20, 2016, provisional application No. 62/352,357, filed on Jun. 20, 2016.

(51) Int. Cl.
*G06F 21/76* (2013.01)
*G06F 21/60* (2013.01)
(Continued)

(52) U.S. Cl.
CPC ............ *G06F 21/602* (2013.01); *G06F 13/20* (2013.01); *G06F 13/28* (2013.01); *G06F 21/57* (2013.01);
(Continued)

(58) Field of Classification Search
None
See application file for complete search history.

(56) References Cited

U.S. PATENT DOCUMENTS

2006/0059574 A1\* 3/2006 Fayad ............... G06F 21/76
726/34
2008/0082828 A1\* 4/2008 Jennings ............ G06F 21/72
713/176

(Continued)

*Primary Examiner* — Venkat Perungavoor
(74) *Attorney, Agent, or Firm* — Barnes & Thornburg LLP (57) ABSTRACT

Technologies for securely binding a manifest to a platform include a computing device having a security engine and a field-programmable fuse. The computing device receives a platform manifest indicative of a hardware configuration of the computing device and a manifest hash. The security engine of the computing device blows a bit of a field programmable fuse and then stores the manifest hash and a counter value of the field-programmable fuse in integrity-protected non-volatile storage. In response to a platform reset, the security engine verifies the stored manifest hash and counter value and then determines whether the stored counter value matches the field-programmable fuse. If verified and current, trusted software may calculate a hash of the platform manifest and compare the calculated hash to the stored manifest hash. If matching, the platform manifest may be used to discover platform hardware. Other embodiments are described and claimed.

25 Claims, 4 Drawing Sheets

(51) Int. Cl.
*H04L 29/06* (2006.01)
*G06F 21/57* (2013.01)
*G06F 13/28* (2006.01)
*H04L 9/32* (2006.01)
*G06F 13/20* (2006.01)
*G06F 21/62* (2013.01)
*G06F 21/85* (2013.01)
*G09C 1/00* (2006.01)
G06F 21/70 (2013.01)
G06F 21/51 (2013.01)
H04L 9/06 (2006.01)

(52) U.S. Cl.
CPC ...... *G06F 21/6218* (2013.01); *G06F 21/6281* (2013.01); *G06F 21/85* (2013.01); *G09C 1/00* (2013.01); *H04L 9/32* (2013.01); *H04L 63/126* (2013.01); *G06F 21/51* (2013.01); *H04L 9/0637* (2013.01); *H04L 9/3242* (2013.01); *H04L 63/12* (2013.01)

(56) References Cited

U.S. PATENT DOCUMENTS

| | | | | |
|---|---|---|---|---|
| 2008/0165952 A1* | 7/2008 | Smith | ............ | G06F 21/57 380/28 |
| 2013/0185548 A1* | 7/2013 | Djabarov | ............ | H04L 41/082 713/2 |
| 2014/0093074 A1* | 4/2014 | Gotze | ............ | H04L 9/0866 380/45 |
| 2014/0380425 A1* | 12/2014 | Lockett | ............ | H04L 63/20 726/4 |
| 2016/0274918 A1* | 9/2016 | Moon | ............ | G06F 21/57 |

\* cited by examiner

TECHNOLOGIES FOR SECURELY BINDING A PLATFORM MANIFEST TO A PLATFORM

CROSS-REFERENCE TO RELATED APPLICATION

The present application claims the benefit of U.S. Provisional Patent Application Nos. 62/352,356 and 62/352,357, which were both filed Jun. 20, 2016.

BACKGROUND

Current processors may provide support for a trusted execution environment such as a secure enclave. Secure enclaves include segments of memory (including code and/or data) protected by the processor from unauthorized access including unauthorized reads and writes. In particular, certain processors may include Intel® Software Guard Extensions (SGX) to provide secure enclave support. In particular, SGX provides confidentiality, integrity, and replay-protection to the secure enclave data while the data is resident in the platform memory and thus provides protection against both software and hardware attacks. The on-chip boundary forms a natural security boundary, where data and code may be stored in plaintext and assumed to be secure. Intel® SGX does not protect I/O data that moves across the on-chip boundary.

Trusted I/O (TIO) technology enables an application to send and/or receive I/O data securely to/from a device. In addition to the hardware that produces or consumes the I/O data, several software and firmware components in the I/O pipeline might also process the data. HCTIO (Hardware Cryptography-based Trusted I/O) is a technology that provides cryptographic protection of DMA data via an inline Crypto Engine (CE) in the system-on-a-chip (SoC). Channel ID, an identifier, uniquely identifies a DMA channel on the platform, and the CE filters DMA traffic and encrypts select I/O transactions upon a match with the Channel ID programmed in the CE.

Computing devices using TIO technology may securely discover devices and controllers using a platform manifest. As described in U.S. Patent Application Publication No. 2017/0024570, a platform manifest may be bound to a computing device by including a unique identifier in the manifest while also permanently storing the identifier on the computing device, for example using a field programmable fuse (FPF) of the computing device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
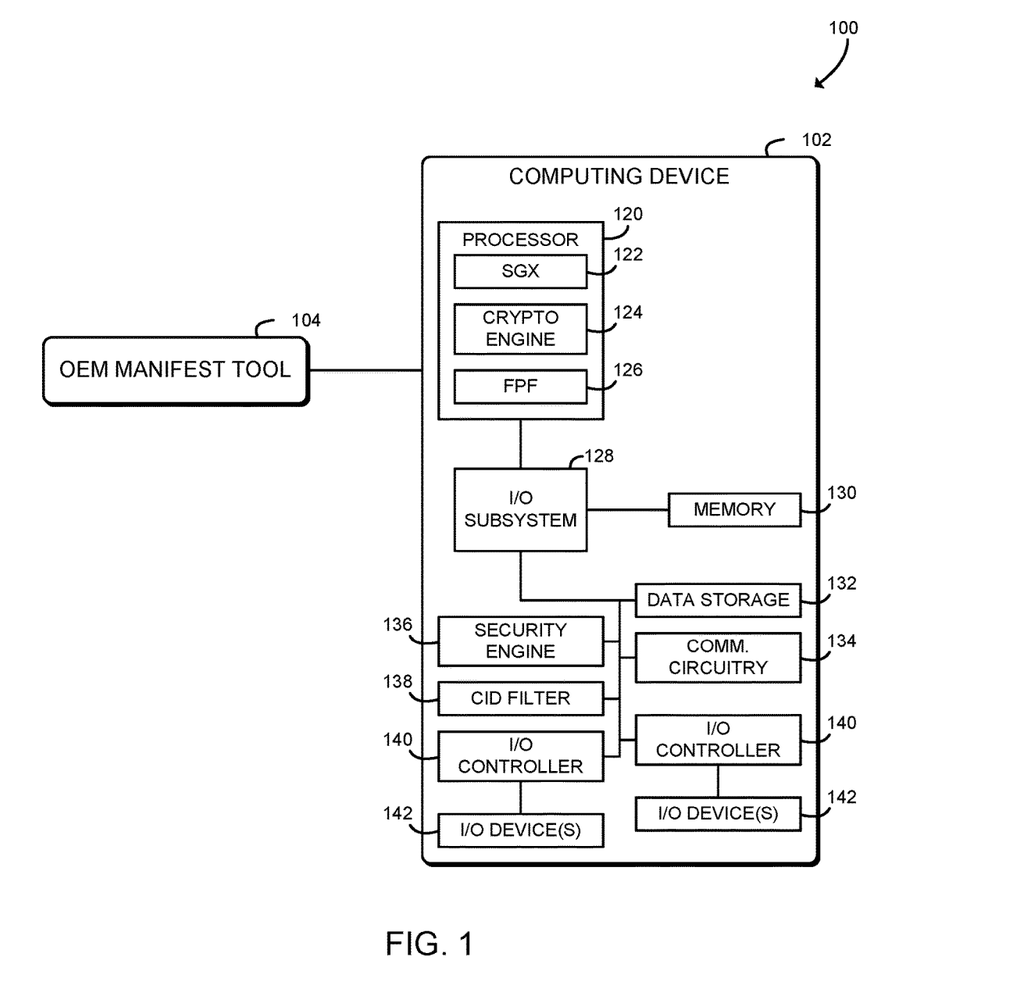
FIG. 1 is a simplified block diagram of at least one embodiment of a system for securely binding a platform manifest to computing device.

Referring now to FIG. 1, an illustrative system for securely binding a platform manifest to a platform includes a computing device 102 and an OEM manifest tool 104. In use, as described further below, the OEM manifest tool 104 generates a platform manifest that describes a hardware configuration of the computing device 102 and a corresponding manifest hash. For example, the platform manifest may be generated in a secure OEM facility during the manufacture or refurbishment of the computing device 102. The computing device 102 receives the platform manifest and manifest hash. The computing device 102 stores the platform manifest in a firmware-accessible location. The computing device 102 blows a bit of a field-programmable fuse, and then stores the manifest hash, the value of the field-programmable fuse, and a message authentication code in non-volatile storage. On subsequent platform resets, the computing device 102 verifies the stored manifest hash and the stored fuse value using the message authentication code and also verifies that the stored fuse value matches the current value of the fuse. If the manifest hash and fuse value are verified, trusted software of the computing device 102 verifies the platform manifest against the stored manifest hash. If the platform manifest is verified, then the computing device 102 may use the platform manifest, for example to enumerate trusted I/O hardware and set up trusted I/O DMA channels. Thus, the system 100 allows a platform manifest to be securely bound to the computing device 102, which may improve trusted I/O security. Additionally, by using the field-programmable fuse as an anti-replay counter, the system 100 may be capable of securely binding the platform manifest to the computing device 102 multiple times. Thus, the system 100 may provide a secure platform manifest for the computing device 102, even if the hardware configuration of the computing device 102 changes.

The computing device 102 may be embodied as any type of device capable of performing the functions described herein. For example, the computing device 102 may be embodied as, without limitation, a computer, a laptop computer, a tablet computer, a notebook computer, a mobile computing device, a smartphone, a wearable computing device, a multiprocessor system, a server, a workstation, and/or a consumer electronic device. As shown in FIG. 1, the illustrative computing device 102 includes a processor 120, an I/O subsystem 128, a memory 130, and a data storage device 132. Additionally, in some embodiments, one or more of the illustrative components may be incorporated in, or otherwise form a portion of, another component. For example, the memory 130, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 illustratively includes secure enclave support 122, a cryptographic engine 124, and one or more field-programmable fuses (FPFs) 126. The secure enclave support 122 allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 130. The secure enclave support 122 may be embodied as a set of processor instruction extensions that allows the processor 120 to establish one or more secure enclaves in the memory 130. For example, the secure enclave support 122 may be embodied as Intel® Software Guard Extensions (SGX) technology.

The cryptographic engine 124 may be embodied as one or more hardware functional blocks (IP blocks), microcode, or other resources of the processor 120 that allows the processor 120 to perform trusted I/O (TIO) functions. For example, the cryptographic engine 124 may perform TIO functions such as encrypting and/or decrypting DMA I/O data input from and/or output to one or more I/O devices 142. In particular, in some embodiments, plaintext I/O data may be stored in a TIO Processor Reserved Memory (TIO PRM) region that is not accessible to software of the computing device 102, and the cryptographic engine 124 may be used to encrypt the plaintext DMA I/O data and copy the encrypted data to an ordinary kernel I/O buffer. The processor 120 may also include programming support to allow software to program the cryptographic engine 124 and a corresponding CID filter 138, described further below. For example, the processor 120 may include one or more processor features to bind programming instructions to the cryptographic engine 124 and/or the CID filter 138, unwrap bound programming instructions, and perform other functions.

The FPF 126 may be embodied as any secure hardware fuse or other component that includes multiple bits. Each bit of the FPF 126 may be blown or otherwise set once, but may not be tampered with or otherwise altered after being set. The FPF 126 may be included in a processor core or uncore of the processor 120, or in other embodiments may be included in a different component of the computing device 102, such as the I/O subsystem 128.

The memory 130 may be embodied as any type of volatile or non-volatile memory or data storage capable of performing the functions described herein. In operation, the memory 130 may store various data and software used during operation of the computing device 102 such operating systems, applications, programs, libraries, and drivers. The memory 130 is communicatively coupled to the processor 120 via the I/O subsystem 128, which may be embodied as circuitry and/or components to facilitate input/output operations with the processor 120, the memory 130, and other components of the computing device 102. For example, the I/O subsystem 128 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 130 may be directly coupled to the processor 120, for example via an integrated memory controller hub. The I/O subsystem 128 may further include secure routing support, which may include hardware support to ensure I/O data cannot be misrouted in the I/O subsystem 128 under the influence of rogue software. The secure routing support may be used with the CID filter 138 to provide cryptographic protection of I/O data. Additionally, in some embodiments, the I/O subsystem 128 may form a portion of a system-on-a-chip (SoC) and be incorporated, along with the processor 120, the memory 130, and other components of the computing device 102, on a single integrated circuit chip.

The data storage device 132 may be embodied as any type of device or devices configured for short-term or long-term storage of data such as, for example, memory devices and circuits, memory cards, hard disk drives, solid-state drives, non-volatile flash memory, or other data storage devices. The computing device 102 may also include a communications subsystem 134, which may be embodied as any communication circuit, device, or collection thereof, capable of enabling communications between the computing device 102, the OEM manifest tool 104, and/or other remote devices over a computer network (not shown). The communications subsystem 134 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

As shown in FIG. 1, the computing device 102 further include a security engine 136, which may be embodied as any hardware component(s) or circuitry capable of providing security-related services to the computing device 102. In particular, the security engine 136 may include a microprocessor, microcontroller, or other embedded controller capable of executing firmware and/or other code independently and securely from the processor 120. Thus, the security engine 136 may be used to establish a trusted execution environment separate from code executed by the processor 120. The security engine 136 may communicate with the processor 120 and/or other components of the computing device 102 over a dedicated bus, such as a host embedded controller interface (HECI). The security engine 136 may also provide remote configuration, control, or management of the computing device 102. In the illustrative embodiment, the security engine 136 is embodied as a converged security and manageability engine (CSME) incorporated in a system-on-a-chip (SoC) of the computing device 102. In some embodiments, the security engine 136 may be embodied as a manageability engine, an out-of-band processor, a Trusted Platform Module (TPM), or other security engine device or collection of devices. Further, in some embodiments, the security engine 136 is also capable of communicating using the communications subsystem 134 or a dedicated communication circuit independently of the state of the computing device 102 (e.g., independently of the state of the main processor 120), also known as "out-of-band" communication. As described further below, the security engine 136 may include "fuse puller" hardware to read the current value of the FPF 126.

The computing device 102 further includes a channel identifier (CID) filter 138, which may be embodied as any hardware component, functional block, logic, or other circuit that performs CID filtering function(s), including filtering I/O transactions based on CIDs inserted by one or more I/O controllers 140. For example, the CID filter 138 may observe DMA transactions inline, perform test(s) based on the CID and memory address included in the transaction, and drop transactions that fail the test(s). In the illustrative embodiment, the CID filter 138 is included in an SoC with the processor 120 and I/O subsystem 128. In other embodiments, the CID filter 138 may be incorporated in one or more components such as the I/O subsystem 128.

Each of the I/O controllers 140 may be embodied as any embedded controller, microcontroller, microprocessor, functional block, logic, or other circuit or collection of circuits capable of performing the functions described herein. In some embodiments, one or more of the I/O controllers 140 may be embedded in another component of the computing device 102 such as the I/O subsystem 128 and/or the processor 120. Additionally or alternatively, one or more of the I/O controllers 140 may be connected to the I/O subsystem 128 and/or the processor 120 via an expansion bus such as PCI Express (PCIe) or other I/O connection. As described above, the I/O controllers 140 communicate with one or more I/O devices 142, for example over a peripheral communications bus (e.g., USB, Bluetooth, etc.). The I/O devices 142 may be embodied as any I/O device, such as human interface devices, keyboards, mice, touch screens, microphones, cameras, and other input devices, as well as displays and other output devices. As described above, the I/O controllers 140 and associated DMA channels are uniquely identified using identifiers called channel identifiers (CIDs). Each I/O controller 140 may assert an appropriate CID with every DMA transaction, for example as part of a transaction layer packet (TLP) prefix, to uniquely identify the source of the DMA transaction and provide liveness protections. The CID also enables the isolation of I/O from different devices 142.

As shown in FIG. 1, the system 100 further includes the OEM manifest tool 104, which may be embodied as any type of computation or computer device capable of performing the functions described herein, including, without limitation, a computer, a workstation, a server, a desktop computer, a network appliance, a laptop computer, a notebook computer, a tablet computer, a mobile computing device, a wearable computing device, a distributed computing system, a processor-based system, and/or a consumer electronic device. Thus, the OEM manifest tool 104 may include a processor, an I/O subsystem, a memory, a data storage device, and/or other components and devices commonly found in a workstation or similar computing device. Those individual components of the OEM manifest tool 104 may be similar to the corresponding components of the computing device 102, the description of which is applicable to the corresponding components of the OEM manifest tool 104 and is not repeated herein so as not to obscure the present disclosure.

As discussed in more detail below, the computing device 102 and the OEM manifest tool 104 may be configured to transmit and receive data with each other and/or other devices of the system 100 via a direct connection and/or a network. The network may be embodied as any number of various wired and/or wireless networks. For example, the network may be embodied as, or otherwise include, a wired or wireless local area network (LAN), a wired or wireless wide area network (WAN), a cellular network, and/or a publicly-accessible, global network such as the Internet or RF network. As such, the network may include any number of additional devices, such as additional computers, routers, wireless access points, and switches, to facilitate communications among the devices of the system 100.

Figure 2:
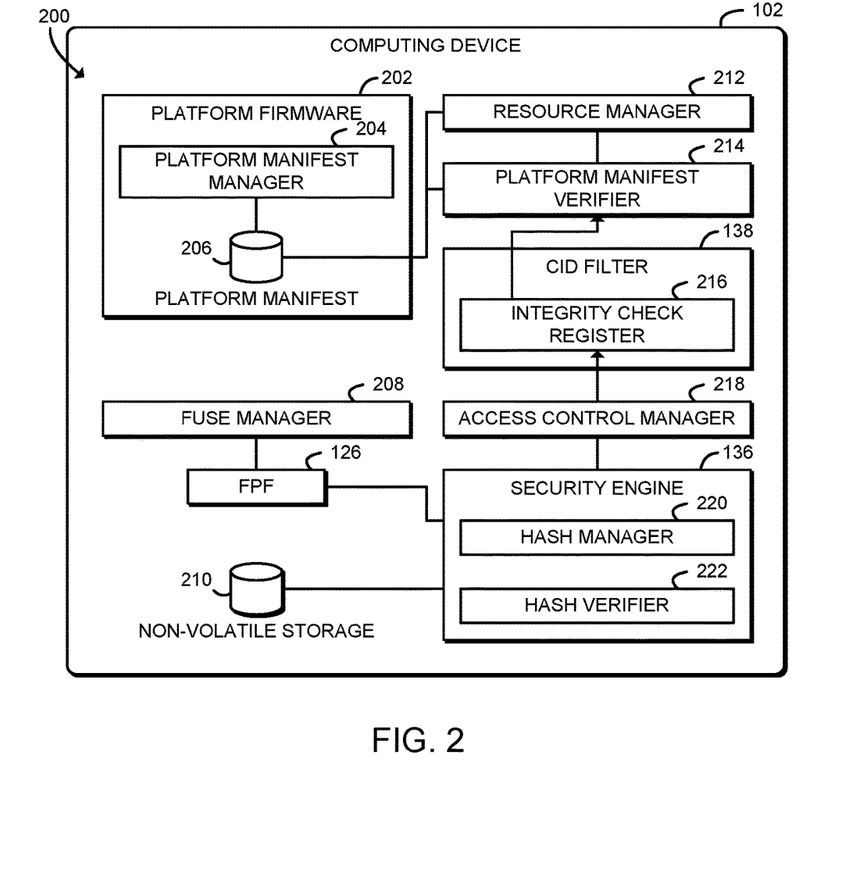
FIG. 2 is a simplified block diagram of at least one embodiment of an environment of the computing device of FIG. 1.

Referring now to FIG. 2, in an illustrative embodiment, the computing device 102 establishes an environment 200 during operation. The illustrative environment 200 includes a platform manifest manager 204, a fuse manager 208, a resource manager 212, a platform manifest verifier 214, an access control manager 218, a hash manager 220, and a hash verifier 222. The various components of the environment 200 may be embodied as hardware, firmware, software, or a combination thereof. As such, in some embodiments, one or more of the components of the environment 200 may be embodied as circuitry or collection of electrical devices (e.g., platform manifest manager circuitry 204, fuse manager circuitry 208, resource manager circuitry 212, platform manifest verifier circuitry 214, access control manager circuitry 218, hash manager circuitry 220, and/or hash verifier circuitry 222). It should be appreciated that, in such embodiments, one or more of the platform manifest manager circuitry 204, the fuse manager circuitry 208, the resource manager circuitry 212, the platform manifest verifier circuitry 214, the access control manager circuitry 218, the hash manager circuitry 220, and/or the hash verifier circuitry 222 may form a portion of the processor 120, the I/O subsystem 128, the security engine 136, the CID filter 138, and/or other components of the computing device 102. Additionally, in some embodiments, one or more of the illustrative components may form a portion of another component and/or one or more of the illustrative components may be independent of one another.

As shown, the environment 200 further includes platform firmware 202. The platform firmware 202 may be embodied as a UEFI BIOS firmware, an ACIP BIOS firmware, or other firmware environment of the computing device 102. As shown, the platform firmware 202 may include, execute, or otherwise establish the platform manifest manager 204. The platform firmware 202 may also include one or more firmware volumes, firmware variables, ACPI tables, non-volatile storage, or other data storage locations that may be used to store a platform manifest 206. The platform manifest manager 204 is configured to receive the platform manifest 206 and store the platform manifest 206 in the firmware storage of the computing device 102. The platform manifest 206 is indicative of a hardware configuration of the computing device 102. For example, the platform manifest 206 may list statically attached hardware components of the computing device 102 (such as I/O controllers 140 and I/O devices 142) and associated hardware identifiers of those devices (e.g., CIDs used to establish trusted I/O DMA channels with those devices). The platform manifest 206 may be received from the OEM manifest tool 104.

In some embodiments, the platform manifest 206 may be embodied as or otherwise included in one or more ACPI tables of the computing device 102. In those embodiments, ACPI may be used as an OS-independent method to expose CID-to-device mapping. An ACPI object may be created in the DSDT/SSDT for every TIO-capable controller 140. The name of the ACPI object is typically named by convention. For example, xHCs in a system are usually given the name SB/USB0, SB/USB1, and so on. An ACPI method with a name determined by convention may be defined under the controller 140 object. The ACPI method may take a bus-specific "physical location" of a device 142 coupled to the controller 140 as input and return the associated CID. The ACPI method name may be any name that is agreed upon between the OEMs and the OSVs (similar to the convention that "CRS" is the ACPI method to return an I/O resource occupied by its containing object). For example, if "TCID" (TIO CID) is the agreed ACPI method name, then _SB/USB0.TCID(<SlotIndex>, <Endpoint>) may return the CID of the endpoint <Endpoint> of the device 142 that is assigned the <SlotIndex>.

The fuse manager 208 is configured to modify a bit of the field-programmable fuse (FPF) 126 in response to receiving a manifest hash. The manifest hash includes a hash of a platform manifest 206, and may be received from the OEM manifest tool 104. The fuse manager 208 may be configured to modify a different bit of the FPF 126 every time a manifest hash is received, for example during initial manufacturing or later refurbishment.

The hash manager 220 is configured to receive the manifest hash and to store the manifest hash and a counter value in a non-volatile storage 210 of the computing device 102 in response to modification of the bit of the FPF 126. The counter value is indicative of the value of the FPF 126. The hash manager 220 is further configured to generate a message authentication code (MAC) over the stored manifest hash and the stored counter value and to store the MAC in the non-volatile storage 210.

The hash verifier 222 is configured to determine whether the stored manifest hash and the stored counter value are authentic based on the MAC in response to a reset of the computing device 102. The hash verifier 222 is further configured to determine whether the stored counter value matches the FPF 126 in response to the reset of the computing device 102. The hash verifier 222 may be further configured to store an integrity check result in an integrity check register 216 of the computing device 102. The integrity check result is indicative of whether the stored manifest hash and the stored counter value are authentic and whether the stored counter value matches the FPF 126. The hash verifier 222 may be further configured to store the stored manifest hash in the register 216 in response to the reset of the computing device 102. As shown, the register 216 may be embodied as a register of the CID filter 138.

As shown in FIG. 2, the hash manager 220 and the hash verifier 222 may be included in, executed by, or otherwise established by the security engine 136. The access control manager 218 is configured to restrict write access to the register 216 to the security engine 136. Other entities, such as a trusted software component via the processor 120 may be allowed read access to the register 216.

The platform manifest verifier 214 is configured to generate a computed hash over the platform manifest 206 in response to determining that the stored manifest hash and the stored counter value are authentic and determining that the stored counter value matches the FPF 126. The platform manifest verifier 214 is further configured to determine whether the computed hash matches the stored manifest hash. The platform manifest verifier 214 may be further configured to read the register 216 of the computing device 102 to determine the integrity check result and the stored manifest hash. The platform manifest verifier 214 may be further configured to indicate an error condition in response to determining that the stored manifest hash and the stored counter value are not authentic or determining that the stored counter value does not match the FPF 126, or in response to determining that the computed hash does not match the stored manifest hash.

The resource manager 212 is configured to use the hardware configuration of the computing device 102 based on the platform manifest 206 in response to determining that the computed hash matches the stored manifest hash. For example, the resource manager 212 may enumerate one or more I/O devices 142 of the computing device 102 and establish trusted I/O DMA channels with those devices 142 using the channel identifiers included in the platform manifest 206. In some embodiments, the platform manifest verifier 214 and/or the resource manager 212 may establish or otherwise execute one or more trusted software components, such as one or more secure enclaves established with the secure enclave support 122 of the processor 120.

Figure 3:
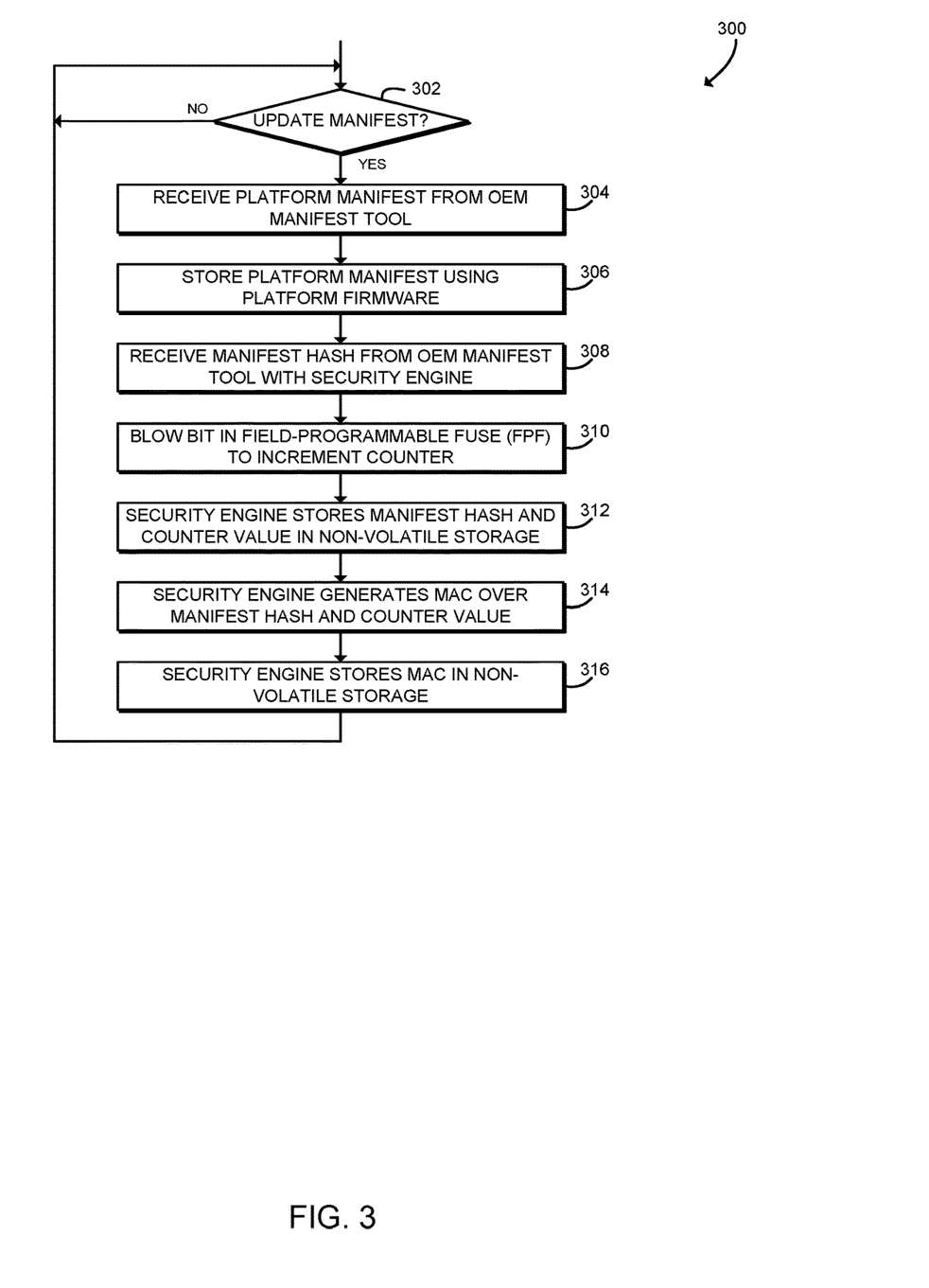
FIG. 3 is a simplified flow diagram of at least one embodiment of a method for updating a platform manifest that may be executed by the computing device of FIGS. 1-2.

Referring now to FIG. 3, in use, the computing device 102 may execute a method 300 for updating a platform manifest. It should be appreciated that, in some embodiments, the operations of the method 300 may be performed by one or more components of the environment 200 of the computing device 102 as shown in FIG. 2. The method 300 begins in block 302, in which the computing device 102 determines whether to update the platform manifest 206. The platform manifest 206 may be updated, for example, during the initial manufacture of the computing device 102, during refurbishment of the computing device 102, or at another time when the hardware configuration of the computing device 102 changes. If the computing device 102 determines not to update the platform manifest 206, the method 300 loops back to block 302 to continue monitoring for updates to the platform manifest 206. If the computing device 102 determines to update the platform manifest 206, the method 300 advances to block 304.

In block 304, the computing device 102 receives the platform manifest 206 from the OEM manifest tool 104. The platform manifest 206 may be embodied as a file, data table, data object, or other data that describes the hardware configuration of the computing device 102. For example, in some embodiments, the platform manifest 206 may describe one or more statically connected I/O controllers 140 and/or I/O devices 142 of the computing device 102. The platform manifest 206 may also include channel identifiers (CIDs) or other hardware identifiers assigned to each of the I/O devices 142. The platform manifest 206 may be generated by the OEM manifest tool 104 based on a one or more ACPI tables or other configuration files that describe the hardware configuration of the computing device 102. The platform manifest 206 may be signed by the OEM using one or more OEM private keys. In block 306, the computing device 102 stores the platform manifest 206 using the platform firmware 202. For example, the platform manifest 206 may be stored in one or more ACPI tables, firmware variables, firmware volumes, or other storage locations accessible to the platform firmware 202.

In block 308, the security engine 136 receives a manifest hash from the OEM manifest tool 104. The manifest hash may be embodied as any hash value generated as a function of the platform manifest 206. Thus, changes to the platform manifest 206 cause corresponding changes to the manifest hash.

In block 310, the computing device 102 blows or otherwise sets a bit in the FPF 126 to increment an anti-replay counter. The computing device 102 may, for example, blow a bit that has not previously been blown. After being blown or otherwise set, the bit of the FPF 126 is permanently changed and cannot be "un-set." As described further below, the FPF 126 is used as an anti-replay counter to protect the manifest hash, and blowing a bit of the FPF 126 may be considered "incrementing" the counter. Because a bit of the FPF 126 is blown every time the counter is incremented, the computing device 102 may protect the manifest hash multiple times, up to the number of bits in the FPF 126. For example, a four-bit FPF 126 may protect the manifest hash four times.

In block 312, the security engine 136 stores the manifest hash and the counter value of the FPF 126 in the non-volatile storage 210. The security engine 136 may read the value of the FPF 126 using the fuse puller hardware of the security engine 136. The manifest hash and the counter value may be stored in, for example, a flash memory device that is accessible to the security engine 136. In some embodiments, the contents of the non-volatile storage 210 may be restricted to the security engine 136 and/or otherwise not accessible by the processor 120 of the computing device 102.

In block 314, the security engine 136 generates a message authentication code (MAC) or other integrity protection value over the manifest hash and the counter value. The security engine 136 may use any appropriate algorithm to generate the MAC. In block 316, the security engine 136 stores the MAC in the non-volatile storage 210. As described further below in connection with FIG. 4, the computing device 102 may verify the stored manifest hash and the counter value using the MAC. After storing the MAC, the method 300 loops back to block 302, in which the computing device 102 continues to monitor for platform manifest 206 updates.

Figure 4:
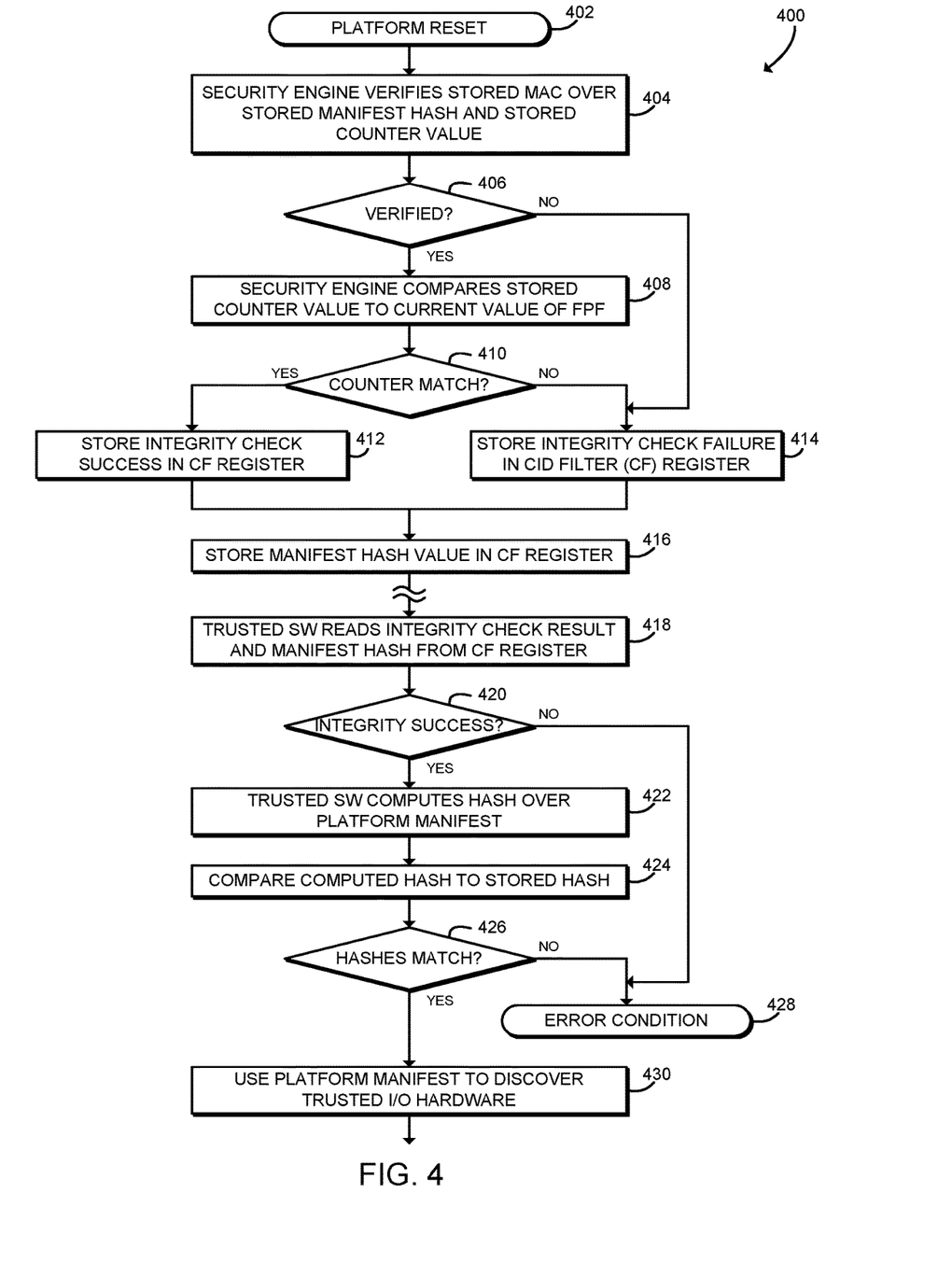
FIG. 4 is a simplified flow diagram of at least one embodiment of a method for verifying a platform manifest that may be executed by the computing device of FIGS. 1-2.

Referring now to FIG. 4, in use, the computing device 102 may execute a method 400 for verifying a platform manifest. It should be appreciated that, in some embodiments, the operations of the method 400 may be performed by one or more components of the environment 200 of the computing device 102 as shown in FIG. 2. The method 400 begins in block 402, in which the computing device 102 performs a platform reset. The computing device 102 may perform a reset, for example, in response to powering on or in response to a reboot event. In response to the platform reset, components of the computing device 102 such as the processor 120 and the security engine 136 may also be reset and then start executing firmware or other initial boot code.

In block 404, the security engine 136 verifies the stored MAC over the stored manifest hash and the stored counter value. The security engine 136 reads the stored MAC, the stored manifest hash, and the stored counter value from the non-volatile storage 210. The security engine 136 may use any appropriate algorithm to verify that the stored MAC corresponds to the current values of the stored manifest hash and the stored counter value. As described above in connection with block 314 of FIG. 3, the MAC was previously generated by the security engine 136 and stored in the non-volatile storage 210. Thus, verifying the MAC ensures that the stored manifest hash and the stored counter value have not been altered since being stored in the non-volatile storage 210. In block 406, the security engine 136 determines whether the MAC was successfully verified. If not, the method 400 branches ahead to block 414, described further below. If the MAC was successfully verified, the method 400 advances to block 408.

In block 408, the security engine 136 compares the stored counter value from the non-volatile storage to the current value of the FPF 126. The security engine 136 may, for example, use fuse puller hardware to read the current value of the FPF 126. In block 410, the security engine 136 determines whether the stored counter value matches the current value of the FPF 126. If not, the method 400 branches ahead to block 414, described further below. If the counter values match, the method 400 branches to block 412.

In block 412, the security engine 136 stores an integrity check success value in a register 216 of the CID filter 138. The security engine 136 may, for example, set one or more bits, fields, or other parts of the register 216 in the CID filter 138 to indicate that the stored manifest hash and the stored counter value were successfully verified and that the stored counter value matches the FPF 126. Write access to the register 216 of the CID filter 138 may be limited to the security engine 136. For example, the computing device 102 may restrict write access to the register 216 using an access control mechanism such as a security attributes of initiator (SAI) policy register. As described further below, trusted software may securely read the integrity check result from the register 216 using one or more processor features provided by the processor 120. After storing the integrity check success value in the register 216, the method 400 proceeds to block 416, described below.

Referring back to block 410, if the counter values do not match, the method 400 branches to block 414, in which the security engine 136 stores an integrity check failure value in the register 216 of the CID filter 138. The security engine 136 may, for example, set one or more bits, fields, or other parts of the register 216 in the CID filter 138 to indicate that the stored manifest hash and the stored counter value were not successfully verified or that the stored counter value does not match the FPF 126. As described above, write access to the register 216 of the CID filter 138 may be limited to the security engine 136, and trusted software may read the integrity check result from the register 216 using the processor 120. After storing the integrity check failure value in the register 216, the method 400 proceeds to block 416.

In block 416, the security engine 136 stores the manifest hash value in a register of the CID filter 138. The register used to store the manifest hash value may be the same register 216 used to store the integrity check result or a different register. Similar to the integrity check result, write access to the register used to store the manifest hash may be limited to the security engine 136, and trusted software may read the integrity check result from the register using the processor 120.

After storing the integrity check result and the manifest hash, the computing device 102 may proceed to load an operating system or other control software. During execution, the operating system may load one or more trusted software components, such as secure enclaves protected with the secure enclave support 122 of the processor 120. In block 418, trusted software of the computing device 102 reads the integrity check result (e.g., success or failure) and the manifest hash from the register 216 of the CID filter 138. To read the register 216, the trusted software may invoke one or more features of the processor 120. For example, the trusted software may execute an EBIND instruction to bind programming information to the CID filter 138 (e.g., encrypt and verify the programming information). Untrusted software (e.g., an operating system driver or other kernel-mode code) may receive the bound programming information and execute an UNWRAP instruction to cause the processor to unwrap (e.g., decrypt and verify) the programming information and securely read the register 216 of the CID filter 138.

In block 420, the computing device 102 determines whether the integrity check result indicates success. In other words, the computing device 102 determines whether the value of the integrity check result from the register 216 in the CID filter 138 indicates that the stored manifest hash and the stored counter value were verified and that the stored counter value matched the FPF 126. If not (i.e., if the stored manifest hash and the stored counter value were not verified or the stored counter value did not match the FPF 126), the method 400 branches to block 428, described below. If the integrity check result indicates success, the method 400 proceeds to block 422.

In block 422, the trusted software of the computing device 102 computes a hash over the platform manifest 206. The hash may be embodied as any hash value generated as a function of the platform manifest 206. In particular, the trusted software may use the same hash function or other algorithm used by the OEM manifest tool 104 to generate the manifest hash as described above in connection with block 308 of FIG. 3. The trusted software may read the platform manifest 206 from the firmware storage, such as one or more ACPI tables, firmware variables, or other firmware storage.

In block 424, after computing the hash, the trusted software of the computing device 102 compares the computed hash to the stored hash read from the register 216 of the CID filter 138. In block 426, the computing device 102 determines whether the computed hash matches the stored hash. If not, the method 400 branches to block 428, in which the computing device 102 indicates an error condition. The computing device 102 may, for example, generate an error message to the user, log an error, or otherwise indicate that the platform manifest 206 was not verified. In some embodiments, the computing device 102 may also perform a security response, such as preventing the computing device 102 from using the platform manifest 206 to discover the hardware configuration of the computing device 102. After indicating the error condition, the method 400 is complete. The method 400 may be executed again in response to a subsequent platform reset.

Referring back to block 426, if the computed hash and the stored hash match, the method 400 advances to block 430, in which the computing device 102 uses the platform manifest 206 to discover trusted I/O hardware. For example, trusted software such as a secure enclave may use the platform manifest 206 to enumerate statically connected I/O controllers 140 and I/O devices 142, and in some embodiments may enumerate I/O devices 142 that are dynamically connected to the I/O controllers 140. After discovering the hardware, the method 400 is complete and the computing device 102 may continue ordinary execution. Accordingly, trusted software may establish one or more trusted I/O channels to the I/O controllers 140 and/or I/O devices 142 using hardware identifiers (e.g., CID) included in the platform manifest 206. The trusted I/O channels may be used to securely transmit I/O data over the trusted I/O channels. The method 400 may be executed repeatedly in response to subsequent platform resets.

It should be appreciated that, in some embodiments, the methods 300 and/or 400 may be embodied as various instructions stored on a computer-readable media, which may be executed by the processor 120, the I/O subsystem 128, the security engine 136, and/or other components of the computing device 102 to cause the computing device 102 to perform the respective method 300 and/or 400 respectively. The computer-readable media may be embodied as any type of media capable of being read by the computing device 102 including, but not limited to, the memory 130, the data storage device 132, firmware devices, other memory or data storage devices of the computing device 102, portable media readable by a peripheral device 142 of the computing device 102, and/or other media.

EXAMPLES

Illustrative examples of the technologies disclosed herein are provided below. An embodiment of the technologies may include any one or more, and any combination of, the examples described below.

Example 1 includes a computing device for platform manifest management, the computing device comprising: a field-programmable fuse; a security engine, wherein the security engine comprises a hash manager to receive a manifest hash, wherein the manifest hash comprises a hash of a platform manifest, and wherein the platform manifest is indicative of a hardware configuration of the computing device; and a fuse manager to modify a bit of the field-programmable fuse in response to receipt the manifest hash; wherein the hash manager is further to (i) store the manifest hash and a counter value in a non-volatile storage of the computing device in response to modification of the bit to generate a stored manifest hash and a stored counter value, wherein the counter value is indicative of a value of the field-programmable fuse, (ii) generate a message authentication code over the stored manifest hash and the stored counter value in response to the modification of the bit, and (iii) store the message authentication code in the non-volatile storage.

Example 2 includes the subject matter of Example 1, and wherein the security engine comprises a converged security and manageability engine.

Example 3 includes the subject matter of any of Examples 1 and 2, and further comprising a platform manifest manager to: receive the platform manifest; and store the platform manifest in firmware storage of the computing device in response to receipt of the platform manifest.

Example 4 includes the subject matter of any of Examples 1-3, and wherein to store the platform manifest in firmware storage comprises to store the platform manifest in an ACPI firmware table of the computing device.

Example 5 includes the subject matter of any of Examples 1-4, and wherein to receive the manifest hash comprises to receive the manifest hash from an OEM manifest tool device.

Example 6 includes the subject matter of any of Examples 1-5, and wherein to receive the manifest hash comprises to receive an updated manifest hash, wherein the platform manifest is indicative of an updated hardware configuration of the computing device.

Example 7 includes the subject matter of any of Examples 1-6, and wherein the security engine further comprises a hash verifier to: determine whether the stored manifest hash and the stored counter value are authentic based on the message authentication code in response to storage of the message authentication code and in response to a reset of the computing device; and determine whether the stored counter value matches the field-programmable fuse in response to the reset of the computing device.

Example 8 includes the subject matter of any of Examples 1-7, and further comprising a platform manifest verifier to: generate a computed hash over the platform manifest in response to a determination that the stored manifest hash and the stored counter value are authentic and a determination that the stored counter value matches the field-programmable fuse; and determine whether the computed hash matches the stored manifest hash.

Example 9 includes the subject matter of any of Examples 1-8, and further comprising a resource manager to use the hardware configuration of the computing device based on the platform manifest in response to a determination that the computed hash matches the stored manifest hash.

Example 10 includes the subject matter of any of Examples 1-9, and wherein to use the hardware configuration comprises to enumerate one or more I/O devices of the computing device, wherein the platform manifest is indicative of the one or more I/O devices of the computing device.

Example 11 includes the subject matter of any of Examples 1-10, and wherein: to generate the computed hash comprises to generate the computed hash by a trusted software component of the computing device; to determine whether the computed hash matches the stored manifest hash comprises to determine whether the computed hash matches the stored manifest hash by the trusted software component; and to use the hardware configuration of the computing device comprises to use the hardware configuration of the computing device by the trusted software component.

Example 12 includes the subject matter of any of Examples 1-11, and wherein the platform manifest verifier is further to indicate an error condition in response to a determination that the stored manifest hash and the stored counter value are not authentic or a determination that the stored counter value does not match the field-programmable fuse, or in response to a determination that the computed hash does not match the stored manifest hash.

Example 13 includes the subject matter of any of Examples 1-12, and wherein: the hash verifier is further to (i) store an integrity check result in a register of the computing device, wherein the integrity check result is indicative of whether the stored manifest hash and the stored counter value are authentic and whether the stored counter value matches the field-programmable fuse, and (ii) store the stored manifest hash in the register in response to the reset of the computing device; to generate the computed hash comprises to generate the computed hash in response to storage of the integrity check result in the register; and to determine whether the computed hash matches the stored manifest hash comprises to determine whether the computed hash matches the stored manifest hash in in response to storage of the stored manifest hash in the register.

Example 14 includes the subject matter of any of Examples 1-13, and wherein the register of the computing device comprises a register of a channel identifier filter of the computing device.

Example 15 includes the subject matter of any of Examples 1-14, and further comprising an access control manager to restrict write access to the register to the security engine.

Example 16 includes the subject matter of any of Examples 1-15, and wherein: the platform manifest verifier is further to read the register by a trusted software component of the computing device to determine the integrity check result and the stored manifest hash; and to generate the computed hash comprises to generate the computed hash in response to a reading of the register.

Example 17 includes the subject matter of any of Examples 1-16, and wherein to read the register comprises to execute an UNWRAP processor instruction to read the register.

Example 18 includes a method for platform manifest management, the method comprising: receiving, by a security engine of a computing device, a manifest hash, wherein the manifest hash comprises a hash of a platform manifest, and wherein the platform manifest is indicative of a hardware configuration of the computing device; modifying, by the computing device, a bit of a field-programmable fuse of the computing device in response to receiving the manifest hash; storing, by the security engine, the manifest hash and a counter value in a non-volatile storage of the computing device in response to modifying the bit to generate a stored manifest hash and a stored counter value, wherein the counter value is indicative of a value of the field-programmable fuse; generating, by the security engine, a message authentication code over the stored manifest hash and the stored counter value in response to modifying the bit; and storing, by the security engine, the message authentication code in the non-volatile storage.

Example 19 includes the subject matter of Example 18, and wherein the security engine comprises a converged security and manageability engine.

Example 20 includes the subject matter of any of Examples 18 and 19, and further comprising: receiving, by the computing device, the platform manifest; and storing, by the computing device, the platform manifest in firmware storage of the computing device in response to receiving the platform manifest.

Example 21 includes the subject matter of any of Examples 18-20, and wherein storing the platform manifest in firmware storage comprises storing the platform manifest in an ACPI firmware table of the computing device.

Example 22 includes the subject matter of any of Examples 18-21, and wherein receiving the manifest hash comprises receiving the manifest hash from an OEM manifest tool device.

Example 23 includes the subject matter of any of Examples 18-22, and wherein receiving the manifest hash comprises receiving an updated manifest hash, wherein the platform manifest is indicative of an updated hardware configuration of the computing device.

Example 24 includes the subject matter of any of Examples 18-23, and further comprising: determining, by the security engine, whether the stored manifest hash and the stored counter value are authentic based on the message authentication code in response to storing the message authentication code and in response to a reset of the computing device; and determining, by the security engine, whether the stored counter value matches the field-programmable fuse in response to the reset of the computing device.

Example 25 includes the subject matter of any of Examples 18-24, and further comprising: generating, by the computing device, a computed hash over the platform manifest in response to determining that the stored manifest hash and the stored counter value are authentic and determining that the stored counter value matches the field-programmable fuse; and determining, by the computing device, whether the computed hash matches the stored manifest hash.

Example 26 includes the subject matter of any of Examples 18-25, and further comprising using, by the computing device, the hardware configuration of the computing device based on the platform manifest in response to determining that the computed hash matches the stored manifest hash.

Example 27 includes the subject matter of any of Examples 18-26, and wherein using the hardware configuration comprises enumerating one or more I/O devices of the computing device, wherein the platform manifest is indicative of the one or more I/O devices of the computing device.

Example 28 includes the subject matter of any of Examples 18-27, and wherein: generating the computed hash comprises generating the computed hash by a trusted software component of the computing device; determining whether the computed hash matches the stored manifest hash comprises determining whether the computed hash matches the stored manifest hash by the trusted software component; and using the hardware configuration of the computing device comprises using the hardware configuration of the computing device by the trusted software component.

Example 29 includes the subject matter of any of Examples 18-28, and further comprising indicating, by the computing device, an error condition in response to determining that the stored manifest hash and the stored counter value are not authentic or determining that the stored counter value does not match the field-programmable fuse, or in response to determining that the computed hash does not match the stored manifest hash.

Example 30 includes the subject matter of any of Examples 18-29, and further comprising: storing, by the security engine, an integrity check result in a register of the computing device, wherein the integrity check result is indicative of whether the stored manifest hash and the stored counter value are authentic and whether the stored counter value matches the field-programmable fuse; and storing, by the security engine, the stored manifest hash in the register in response to the reset of the computing device; wherein generating the computed hash comprises generating the computed hash in response to storing the integrity check result in the register; and wherein determining whether the computed hash matches the stored manifest hash comprises determining whether the computed hash matches the stored manifest hash in in response to storing the stored manifest hash in the register.

Example 31 includes the subject matter of any of Examples 18-30, and wherein the register of the computing device comprises a register of a channel identifier filter of the computing device.

Example 32 includes the subject matter of any of Examples 18-31, and further comprising restricting, by the computing device, write access to the register to the security engine.

Example 33 includes the subject matter of any of Examples 18-32, and further comprising: reading, by a trusted software component of the computing device, the register to determine the integrity check result and the stored manifest hash; wherein generating the computed hash comprises generating the computed hash in response to reading the register.

Example 34 includes the subject matter of any of Examples 18-33, and wherein reading the register comprises executing an UNWRAP processor instruction to read the register.

Example 35 includes a computing device comprising: a processor; and a memory having stored therein a plurality of instructions that when executed by the processor cause the computing device to perform the method of any of Examples 18-34.

Example 36 includes one or more machine readable storage media comprising a plurality of instructions stored thereon that in response to being executed result in a computing device performing the method of any of Examples 18-34.

Example 37 includes a computing device comprising means for performing the method of any of Examples 18-34.

Example 38 includes a computing device for platform manifest management, the computing device comprising: means for receiving, by a security engine of the computing device, a manifest hash, wherein the manifest hash comprises a hash of a platform manifest, and wherein the platform manifest is indicative of a hardware configuration of the computing device; means for modifying a bit of a field-programmable fuse of the computing device in response to receiving the manifest hash; means for storing, by the security engine, the manifest hash and a counter value in a non-volatile storage of the computing device in response to modifying the bit to generate a stored manifest hash and a stored counter value, wherein the counter value is indicative of a value of the field-programmable fuse; means for generating, by the security engine, a message authentication code over the stored manifest hash and the stored counter value in response to modifying the bit; and means for storing, by the security engine, the message authentication code in the non-volatile storage.

Example 39 includes the subject matter of Example 38, and wherein the security engine comprises a converged security and manageability engine.

Example 40 includes the subject matter of any of Examples 38 and 39, and further comprising: means for receiving the platform manifest; and means for storing the platform manifest in firmware storage of the computing device in response to receiving the platform manifest.

Example 41 includes the subject matter of any of Examples 38-40, and wherein the means for storing the platform manifest in firmware storage comprises means for storing the platform manifest in an ACPI firmware table of the computing device.

Example 42 includes the subject matter of any of Examples 38-41, and wherein the means for receiving the manifest hash comprises means for receiving the manifest hash from an OEM manifest tool device.

Example 43 includes the subject matter of any of Examples 38-42, and wherein the means for receiving the manifest hash comprises means for receiving an updated manifest hash, wherein the platform manifest is indicative of an updated hardware configuration of the computing device.

Example 44 includes the subject matter of any of Examples 38-43, and further comprising: means for determining, by the security engine, whether the stored manifest hash and the stored counter value are authentic based on the message authentication code in response to storing the message authentication code and in response to a reset of the computing device; and means for determining, by the security engine, whether the stored counter value matches the field-programmable fuse in response to the reset of the computing device.

Example 45 includes the subject matter of any of Examples 38-44, and further comprising: means for generating a computed hash over the platform manifest in response to determining that the stored manifest hash and the stored counter value are authentic and determining that the stored counter value matches the field-programmable fuse; and means for determining whether the computed hash matches the stored manifest hash.

Example 46 includes the subject matter of any of Examples 38-45, and further comprising means for using the hardware configuration of the computing device based on the platform manifest in response to determining that the computed hash matches the stored manifest hash.

Example 47 includes the subject matter of any of Examples 38-46, and wherein the means for using the hardware configuration comprises means for enumerating one or more I/O devices of the computing device, wherein the platform manifest is indicative of the one or more I/O devices of the computing device.

Example 48 includes the subject matter of any of Examples 38-47, and wherein: the means for generating the computed hash comprises means for generating the computed hash by a trusted software component of the computing device; the means for determining whether the computed hash matches the stored manifest hash comprises means for determining whether the computed hash matches the stored manifest hash by the trusted software component; and the means for using the hardware configuration of the computing device comprises means for using the hardware configuration of the computing device by the trusted software component.

Example 49 includes the subject matter of any of Examples 38-48, and further comprising means for indicating an error condition in response to determining that the stored manifest hash and the stored counter value are not authentic or determining that the stored counter value does not match the field-programmable fuse, or in response to determining that the computed hash does not match the stored manifest hash.

Example 50 includes the subject matter of any of Examples 38-49, and further comprising: means for storing, by the security engine, an integrity check result in a register of the computing device, wherein the integrity check result is indicative of whether the stored manifest hash and the stored counter value are authentic and whether the stored counter value matches the field-programmable fuse; and means for storing, by the security engine, the stored manifest hash in the register in response to the reset of the computing device; wherein the means for generating the computed hash comprises means for generating the computed hash in response to storing the integrity check result in the register; and wherein the means for determining whether the computed hash matches the stored manifest hash comprises means for determining whether the computed hash matches the stored manifest hash in in response to storing the stored manifest hash in the register.

Example 51 includes the subject matter of any of Examples 38-50, and wherein the register of the computing device comprises a register of a channel identifier filter of the computing device.

Example 52 includes the subject matter of any of Examples 38-51, and further comprising means for restricting write access to the register to the security engine.

Example 53 includes the subject matter of any of Examples 38-52, and further comprising: means for reading, by a trusted software component of the computing device, the register to determine the integrity check result and the stored manifest hash; wherein the means for generating the computed hash comprises means for generating the computed hash in response to reading the register.

Example 54 includes the subject matter of any of Examples 38-53, and wherein the means for reading the register comprises means for executing an UNWRAP processor instruction to read the register.

The invention claimed is:

1. A computing device for platform manifest management, the computing device comprising:
 a field-programmable fuse;
 a security engine, wherein the security engine comprises a hash manager to receive a manifest hash, wherein the manifest hash comprises a hash of a platform manifest, and wherein the platform manifest is indicative of a hardware configuration of the computing device; and
 a fuse manager to modify a bit of the field-programmable fuse in response to receipt the manifest hash;
 wherein the hash manager is further to (i) store the manifest hash and a counter value in a non-volatile storage of the computing device in response to modification of the bit to generate a stored manifest hash and a stored counter value, wherein the counter value is indicative of a value of the field-programmable fuse, (ii) generate a message authentication code over the stored manifest hash and the stored counter value in response to the modification of the bit, and (iii) store the message authentication code in the non-volatile storage.

2. The computing device of claim 1, wherein the security engine comprises a converged security and manageability engine.

3. The computing device of claim 1, further comprising a platform manifest manager to:
 receive the platform manifest; and
 store the platform manifest in firmware storage of the computing device in response to receipt of the platform manifest.

4. The computing device of claim 3, wherein to store the platform manifest in firmware storage comprises to store the platform manifest in an ACPI firmware table of the computing device.

5. The computing device of claim 1, wherein to receive the manifest hash comprises to receive an updated manifest hash, wherein the platform manifest is indicative of an updated hardware configuration of the computing device.

6. The computing device of claim 1, wherein the security engine further comprises a hash verifier to:
 determine whether the stored manifest hash and the stored counter value are authentic based on the message authentication code in response to storage of the message authentication code and in response to a reset of the computing device; and determine whether the stored counter value matches the field-programmable fuse in response to the reset of the computing device.

7. The computing device of claim 6, further comprising a platform manifest verifier to:

generate a computed hash over the platform manifest in response to a determination that the stored manifest hash and the stored counter value are authentic and a determination that the stored counter value matches the field-programmable fuse; and determine whether the computed hash matches the stored manifest hash.

8. The computing device of claim 7, further comprising a resource manager to use the hardware configuration of the computing device based on the platform manifest in response to a determination that the computed hash matches the stored manifest hash.

9. The computing device of claim 7, wherein:

the hash verifier is further to (i) store an integrity check result in a register of the computing device, wherein the integrity check result is indicative of whether the stored manifest hash and the stored counter value are authentic and whether the stored counter value matches the field-programmable fuse, and (ii) store the stored manifest hash in the register in response to the reset of the computing device;

to generate the computed hash comprises to generate the computed hash in response to storage of the integrity check result in the register; and to determine whether the computed hash matches the stored manifest hash comprises to determine whether the computed hash matches the stored manifest hash in in response to storage of the stored manifest hash in the register.

10. The computing device of claim 9, wherein the register of the computing device comprises a register of a channel identifier filter of the computing device.

11. The computing device of claim 10, further comprising an access control manager to restrict write access to the register to the security engine.

12. The computing device of claim 9, wherein:

the platform manifest verifier is further to read the register by a trusted software component of the computing device to determine the integrity check result and the stored manifest hash; and to generate the computed hash comprises to generate the computed hash in response to a reading of the register.

13. The computing device of claim 12, wherein to read the register comprises to execute an UNWRAP processor instruction to read the register.

14. A method for platform manifest management, the method comprising:

receiving, by a security engine of a computing device, a manifest hash, wherein the manifest hash comprises a hash of a platform manifest, and wherein the platform manifest is indicative of a hardware configuration of the computing device;

modifying, by the computing device, a bit of a field-programmable fuse of the computing device in response to receiving the manifest hash;

storing, by the security engine, the manifest hash and a counter value in a non-volatile storage of the computing device in response to modifying the bit to generate a stored manifest hash and a stored counter value, wherein the counter value is indicative of a value of the field-programmable fuse;

generating, by the security engine, a message authentication code over the stored manifest hash and the stored counter value in response to modifying the bit; and storing, by the security engine, the message authentication code in the non-volatile storage.

15. The method of claim 14, wherein the security engine comprises a converged security and manageability engine.

16. The method of claim 14, further comprising:

receiving, by the computing device, the platform manifest; and storing, by the computing device, the platform manifest in firmware storage of the computing device in response to receiving the platform manifest.

17. The method of claim 14, further comprising:

determining, by the security engine, whether the stored manifest hash and the stored counter value are authentic based on the message authentication code in response to storing the message authentication code and in response to a reset of the computing device; and determining, by the security engine, whether the stored counter value matches the field-programmable fuse in response to the reset of the computing device.

18. The method of claim 17, further comprising:

generating, by the computing device, a computed hash over the platform manifest in response to determining that the stored manifest hash and the stored counter value are authentic and determining that the stored counter value matches the field-programmable fuse; and determining, by the computing device, whether the computed hash matches the stored manifest hash.

19. The method of claim 18, further comprising:

storing, by the security engine, an integrity check result in a register of the computing device, wherein the integrity check result is indicative of whether the stored manifest hash and the stored counter value are authentic and whether the stored counter value matches the field-programmable fuse; and storing, by the security engine, the stored manifest hash in the register in response to the reset of the computing device;

wherein generating the computed hash comprises generating the computed hash in response to storing the integrity check result in the register; and wherein determining whether the computed hash matches the stored manifest hash comprises determining whether the computed hash matches the stored manifest hash in in response to storing the stored manifest hash in the register.

20. One or more computer-readable storage media comprising a plurality of instructions that in response to being executed cause a computing device to:

receive, by a security engine of the computing device, a manifest hash, wherein the manifest hash comprises a hash of a platform manifest, and wherein the platform manifest is indicative of a hardware configuration of the computing device;

modify a bit of a field-programmable fuse of the computing device in response to receiving the manifest hash;

store, by the security engine, the manifest hash and a counter value in a non-volatile storage of the computing device in response to modifying the bit to generate a stored manifest hash and a stored counter value, wherein the counter value is indicative of a value of the field-programmable fuse;

generate, by the security engine, a message authentication code over the stored manifest hash and the stored counter value in response to modifying the bit; and store, by the security engine, the message authentication code in the non-volatile storage.

21. The one or more computer-readable storage media of claim 20, wherein the security engine comprises a converged security and manageability engine.

22. The one or more computer-readable storage media of claim 20, further comprising a plurality of instructions that in response to being executed cause the computing device to:

receive the platform manifest; and store the platform manifest in firmware storage of the computing device in response to receiving the platform manifest.

23. The one or more computer-readable storage media of claim 20, further comprising a plurality of instructions that in response to being executed cause the computing device to:

determine, by the security engine, whether the stored manifest hash and the stored counter value are authentic based on the message authentication code in response to storing the message authentication code and in response to a reset of the computing device; and determine, by the security engine, whether the stored counter value matches the field-programmable fuse in response to the reset of the computing device.

24. The one or more computer-readable storage media of claim 23, further comprising a plurality of instructions that in response to being executed cause the computing device to:

generate a computed hash over the platform manifest in response to determining that the stored manifest hash and the stored counter value are authentic and determining that the stored counter value matches the field-programmable fuse; and determine whether the computed hash matches the stored manifest hash.

25. The one or more computer-readable storage media of claim 24, further comprising a plurality of instructions that in response to being executed cause the computing device to:

store, by the security engine, an integrity check result in a register of the computing device, wherein the integrity check result is indicative of whether the stored manifest hash and the stored counter value are authentic and whether the stored counter value matches the field-programmable fuse; and store, by the security engine, the stored manifest hash in the register in response to the reset of the computing device;

wherein to generate the computed hash comprises to generate the computed hash in response to storing the integrity check result in the register; and wherein to determine whether the computed hash matches the stored manifest hash comprises to determine whether the computed hash matches the stored manifest hash in in response to storing the stored manifest hash in the register.

* * * * *